United States Patent [19]

Hutter

[11] Patent Number: 5,693,702
[45] Date of Patent: Dec. 2, 1997

[54] ROSIN-SUPPORTED UREA- AND URETHANE-MODIFIED EMULSION POLYMERS

[75] Inventor: G. Frederick Hutter, Charleston, S.C.

[73] Assignee: Westvaco Corporation, New York, N.Y.

[21] Appl. No.: 602,371

[22] Filed: Feb. 16, 1996

[51] Int. Cl.[6] ............................................. C08J 3/02
[52] U.S. Cl. ...................... 524/457; 524/270; 524/272
[58] Field of Search ................................. 524/272, 457, 524/270

[56] References Cited

U.S. PATENT DOCUMENTS

| | | | |
|---|---|---|---|
| 2,994,635 | 8/1961 | Reaville et al. | 162/179 |
| 4,427,744 | 1/1984 | Hume, III | 428/462 |
| 4,839,413 | 6/1989 | Kiehlbauch et al. | 524/460 |
| 5,216,064 | 6/1993 | Rivera et al. | 524/457 |
| 5,237,090 | 8/1993 | Swarup et al. | 560/32 |
| 5,268,397 | 12/1993 | Larson | 522/97 |
| 5,306,762 | 4/1994 | Hutter | 524/457 |
| 5,340,894 | 8/1994 | Swarup et al. | 526/301 |
| 5,380,924 | 1/1995 | Heiliger et al. | 562/439 |
| 5,412,142 | 5/1995 | Wilkerson, III et al. | 560/33 |

FOREIGN PATENT DOCUMENTS

| | | | |
|---|---|---|---|
| 0003853 | 1/1982 | Japan | 524/457 |

OTHER PUBLICATIONS

Shay, G. D. and A. F. Rich Urethane-Functional Alkali-Soluble Associative Latex Thickeners Journal of Coatings Technology 58:43-53, 1986.

*Primary Examiner*—Judy M. Reddick
*Attorney, Agent, or Firm*—Daniel B. Reece, IV; Terry B. McDaniel; Richard L. Schmalz

[57] ABSTRACT

The invention relates to rosin-supported emulsion polymer compositions which are modified with urea-containing monomers and/or urethane-containing monomers reacted with conventional acrylic or styrenic monomers to produce emulsion polymer latices. These emulsion polymer latices can be utilized to formulate printing inks exhibiting superior peel resistances for use in adhesive and extrusion lamination printings.

8 Claims, No Drawings

ROSIN-SUPPORTED UREA- AND URETHANE-MODIFIED EMULSION POLYMERS

FIELD OF INVENTION

The invention relates to rosin-supported emulsion polymer compositions which are modified with urea-containing monomers and/or urethane-containing monomers reacted with conventional acrylic or styrenic monomers to produce emulsion polymer latices. These emulsion polymer latices can be utilized to formulate printing inks exhibiting superior peel resistance for use in adhesive and extrusion lamination printing.

BACKGROUND OF THE INVENTION

Acrylic latices used in the production of printing inks often contain what is called a support resin. These water- and alkali-soluble (at a pH of about 8) resins are added to the emulsion polymerization reaction to improve the stability and rheological properties of the latex. Improved stability results from adsorption of the resin of the surface of the particles and the increased viscosity of the emulsion.

Lamination, the bringing together of two or more substrates, is most commonly practiced in the printing industry by the use of either an adhesive or extrusion process. For example, in adhesive lamination printing the design is normally reversed printed on film and the adhesive is coated over the ink system.

While few guidelines can be given in formulating inks for lamination printing, it is clear that the inks must show a good level of adhesion to the base film. Lack of sufficient adhesion in inks utilized for lamination printing has long been a problem plaguing the ink industry.

Therefore, it is an object of this invention to provide rosin-supported emulsion polymer latices which can be utilized to produce water-based ink formulations which exhibit superior adhesion properties for use in adhesive and extrusion lamination printing.

SUMMARY OF THE INVENTION

The object of this invention is met by the use of rosin-based support resins to produce emulsion polymer latices. These resins are produced from rosin fortified via a Dieis-Alder reaction with fumaric acid or maleic anhydride (or a combination of the two), followed by esterification of the fortified rosin with a polyol or a combination of polyols. The rosin-based resins are subsequently used as support resins in emulsion polymerization reactions with a member selected from the group consisting of urea-containing monomers, urethane-containing monomers, and combinations thereof; which are reacted with conventional acrylic or styrenic monomers to produce emulsion polymer latices useful in formulating printing inks for adhesive and extrusion lamination printing.

Printing inks formulated with these polymer emulsion latices exhibit superior adhesive quality and peel strength. These properties make the inks well suited for adhesive and extrusion lamination printing to films (such as polypropylene and polyester).

As mentioned, the invention is directed to rosin-based urea-modified and/or urethane-modified emulsion polymer latices and the process for preparing the same. In addition, the invention is also directed to ink formulations containing such emulsion polymer latices.

DESCRIPTION OF THE PREFERRED EMBODIMENT

The rosin-based support resins are produced by the fortification of rosin followed by esterification with a polyol or a combination of polyols. Rosins which are suitable for use in the reaction include, but are not limited to, the following:

wood rosin, tall oil rosin, and gum rosin.

Tall oil rosin is preferred, more preferably, fortified tall oil rosin made by reaction or mixing with the rosins varying amounts of fumaric acid, maleic anhydride, maleic acid, or combinations thereof. Fortification of rosin via a Dieis-Alder reaction is well known in the art, as evidenced by U.S. Pat. No. 2,994,635 (which is hereby incorporated by reference).

Polyols which are suitable for use in esterification reaction with the fortified rosin include, but are not limited to, the following:

glycerol, sorbitol, pentaerythritol, diethylene glycol, polyethylene glycols, styrene-allyl alcohol copolymer, and combinations thereof.

(Styrene-allyl alcohol copolymer is a hard thermoplastic, low molecular weight polymer manufactured by ARCO.) Polyethylene glycols which are suitable for use in the reaction have an average molecular weight in the range of 100 to 10,000.

The process for producing the desired rosin-based support resins is taught in commonly assigned U.S. Pat. No. 5,306,762 (which is hereby incorporated by reference). The process comprises reacting in an esterification reaction from 60 to 98% by weight of fumarated rosin or maleated rosin (or a combination thereof) with from 2 to 40% by weight of a polyol or combination of polyols. Preferably, the rosin is reacted with sufficient fumaric acid (or maleic anhydride) to consume the available abietic-type isomers. The abietic-type isomers are known chain stoppers in free radical polymerization reactions.

The acid number of the rosin-based support resin affects the properties of the emulsion polymer. A suitable acid number for a rosin-based support resin is in the range of about 120 to 250, with the preferred range being 150 to 200.

The rosin-based support resins are added to emulsion polymerization reactions to produce emulsion polymers (which are, in turn, utilized to formulate printing inks). An emulsion polymer is a high molecular weight polymer finely dispersed in water in the form of particles. Such polymers are formed by the polymerization of monomers capable of undergoing free radical emulsion polymerization. The procedures for producing emulsion polymers are well known to those skilled in the art (as evidenced by U.S. Pat. No. 4,839,413). The average molecular weight of polymers prepared using emulsion polymerization is usually greater than polymers made using solution or bulk polymerization methods. Typically, emulsion polymers have an average molecular weight in the range of 200,000 to 1,000,000.

In practicing the present invention, it is preferable to add the rosin-based support resin to the emulsion polymerization reaction mixture prior to initiation of the polymerization. The resin can be added as a solid, a solution, or slurry (although addition of a resin as a solution is preferred). The monomers employed in the emulsion polymerization reaction can be added to the reaction mixture in either a single stage addition or in a multi-stage addition.

In conducting the present emulsion polymerization reaction, known emulsion polymerization techniques may be employed. Also, standard anionic and nonionic surfactants are utilized in the polymerization reaction as needed to prevent coagulation of the emulsion particles. Preferably, the reaction is conducted at an elevated temperature of from about 60° to 100° C., at ambient pressure and under an inert atmosphere such as nitrogen. The reaction mixture is maintained under agitation employing standard mixing techniques.

Conventional acrylic and styrenic monomers which do not contain either urea or urethane are reacted in a polymerization reaction to produce the desired emulsion polymer latices. About 31.0 to 93.3% by weight of the polymerization reactants are such conventional monomers; with the preferred range being about 55.0 to 86.6%.

Suitable conventional monomers include ethylenically unsaturated monomers such as olefins, monovinylaromatics, alpha, beta-ethylenically unsaturated carboxylic acids and esters thereof, ethylenically unsaturated dicarboxylic anhydrides (or acids) and esters thereof, and halo substituted olefinics. Specific examples of these monomers include, but are not limited to, the following: styrene, alphamethylstyrene, acrylic acid, methacrylic acid, methyl methacrylate, butyl methacrylate, butyl acrylate, 2-ethylhexyl acrylate, ethyl acrylate, hydroxyethyl acrylate, and hydroxyethyl methacrylate.

About 0.5 to 15.0% by weight of the polymerization reactants are urea and/or urethane containing monomers selected from the group consisting of:

I.

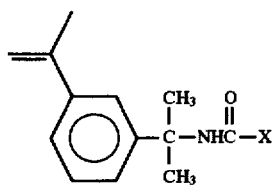

II.

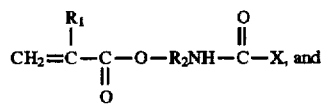

III.

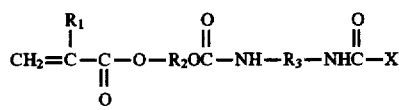

where:

$R_1$ is a member selected from the group consisting of —H and —$CH_3$;

$R_2$ is a member selected from the group consisting of $C_2$ to $C_4$ alkylenes;

$R_3$ is a member selected from the group consisting of $C_4$ to $C_{16}$ hydrocarbyl groups;

X is a member selected from the group consisting of —O—$R_4$ or —$NR_4R_4$;

$R_4$ is a member selected from the group consisting of hydrogen, hydrocarbyl groups, keto-substituted hydrocarbyl groups, amino-substituted hydrocarbyl groups, amido-substituted hydrocarbyl groups, imido-substituted hydrocarbyl groups, ester-substituted hydrocarbyl groups, a ring or substituted ring containing heteroatoms, polyether groups of the form

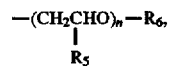

where $R_5$ is a member selected from the group consisting of —H, —$CH_3$, and —$CH_2CH_3$;

$R_6$ is a member selected from the group consisting of hydrocarbyl groups containing from 1 to 24 carbon atoms, and n is from 1 to 10, and combinations thereof; to produce the polymer emulsion product.

The pH at which these emulsion polymers are prepared effects their stability. The suitable pH range for use in the polymerization reactions is from about 7.5 to 10.0, with the preferred range being 8.0 to 9.0.

To summarize, the invention method for the production of polymer emulsion products having pH values in the range of 7.5 to 10.0, comprises reacting in an esterification reaction:

(A) 60.0 to 98.0% by weight of the total composition of the esterification reaction of a member selected from the group consisting of fumarated rosin, maleated rosin, and combinations thereof, and (B) 2.0 to 40.0% by weight of the total composition of the esterification reaction of a polyol selected from the group consisting of polyethylene glycols having an average molecular weight in the range of 100–10,000, glycerol, sorbitol, pentaerythritol, neopenty glycol, ethylene, glycol, and combinations thereof, to produce a rosin-based support resin having an acid number in the range of 120 to 250; and further reacting in a polymerization reaction:

(1) 5.0 to 40.0% by weight of the total composition of the polymerization reaction of said support resin;

(2) 0.2 to 2.0% by weight of the total composition of the polymerization reaction of an initiator;

(3) 1.0 to 12.0% by weight of the total composition of the polymerization reaction of a surfactant; wherein the improvement comprises also reacting in the polymerization reaction (4) 31.0 to 93.3% by weight of the total composition of the polymerization reaction of a member selected from the group consisting of acrylic and styrenic monomers which do not contain either urea or urethane functionalities; and (5) 0.5 to 15.0% by weight of a urea or urethane-containing compound selected from the group consisting of monomers of the formula

I.

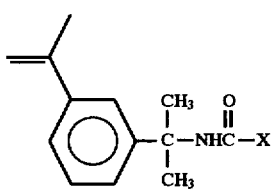

II.

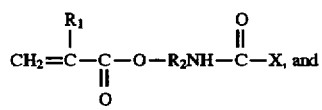

III.

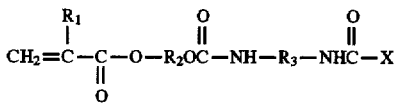

where:

R$_1$ is a member selected from the group consisting of —H and —CH$_3$;

R$_2$ is a member selected from the group consisting of C$_2$ to C$_4$ alkylenes;

R$_3$ is a member selected from the group consisting of C$_4$ to C$_{16}$ hydrocarbyl groups;

X is a member selected from the group consisting of —O—R$_4$ or —NR$_4$R$_4$;

R$_4$ is a member selected from the group consisting of hydrogen, hydrocarbyl groups, keto-substituted hydrocarbyl groups, amino-substituted hydrocarbyl groups, amido-substituted hydrocarbyl groups, imido-substituted hydrocarbyl groups, ester-substituted hydrocarbyl groups, a ring or substituted ring containing heteroatoms, polyether groups of the form

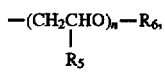

where

R$_5$ is a member selected from the group consisting of —H, —CH$_3$, and —CH$_2$CH$_3$;

R$_6$ is a member selected from the group consisting of hydrocarbyl groups containing from 1 to 24 carbon atoms, and n is from 1 to 10, and combinations thereof; to produce the polymer emulsion product.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A novel polymer emulsion product (latex) was produced via the following procedure. First, a rosin-based support resin was produced via the following process. Into a 1000 ml three-neck round bottom flask was melted 400 g of ROSIN SS (a tall oil-based rosin manufactured by Westvaco, Inc.). The flask was equipped with a Dean Stark trap, condenser, nitrogen inlet, thermocouple, heating mantle, and heating tape. Fumaric acid (100 g) was added to the molten rosin at 150° C., and this mixture was heated to 200° C. and stirred for three hours. At this time glycerol (38.8 g) was slowly added to the rosin, and the resulting mixture was stirred for three hours at 200° C. before cooling and collecting the resin.

The rosin-based support resin was used to formulate an emulsion polymer. A 23.1% solids solution was produced by dissolving 276.0 g of the rosin-resin in water and ammonium hydroxide, and subsequently filtering the solution under vacuum through a #4 paper filter. A 2-liter reaction flask was charged with the resin solution, 50.0 g of ALIPAL EP-120 (an anionic surfactant manufactured by GAF, Inc.), and 13.0 g of IGEPAL CA-897 (an ionic surfactant manufactured by GAF, Inc.). The mixture was heated under a nitrogen blanket, with stirring, to a temperature of 85° C. This temperature was maintained throughout the reaction.

To a one-liter flask was charged a solution of three parts by weight of META-TMI (an isocyanate-containing styrenic monomer manufactured by Cytek Industries) in 10.0 parts of styrene. Subsequently, three parts of ARMEEN C (a primary fatty amine manufactured by AKZO) was added dropwise to the META-TMI. The reaction was immediate and highly exothermic. To the resulting solution was then added 138 parts of butyl acrylate and 146 parts of styrene, to produce 300 parts of monomer solution.

At this time 1.3 g of ammonium persulfate and 4.0 g of water were added to the 2-liter reaction flask, followed by 30.0 g of the monomer mixture. After 20 minutes the remainder of the monomer mixture was added to the reaction over a period of 2 hours.

One hour into the addition of the monomers 1.3 g of ammonium persulfate and 4.0 g of water were added to the reactor. When the addition of the monomers was complete, the reaction was held for 30 minutes, after which time 0.4 g of ammonium persulfate and 3.0 g of water were added to the reactor to consume any remaining monomer. The reaction was maintained at 85° C. for two hours, then cooled to 45° C. The resulting emulsion polymer latex is hereafter referred to as Latex #1.

A traditional styrene-butyl acrylate emulsion polymer latex (i.e., containing no urea or urethane functionalities) was produced as a Control for evaluation purposes using the above process—except that here the one-liter flask was charged with a monomer mixture (141 g of butyl acrylate and 159 g of styrene) which did not contain either urea or urethane.

Inks were made from the Control and Latex #1 via the following formulation:

52 parts of emulsion polymer,
13 parts of isopropanol, and
35 parts of FLEXIVERSE BFD-1121 (a phthalo blue base manufactured by Sun Chemical, Inc.).

The inks were adjusted with a mixture of 80/20:water/isopropanol to a viscosity of 20–25 seconds as measured by a number 2 Zahn cup.

Prints from the inks were made on Mobil LCM treated, biaxially oriented polypropylene with a K-Coater using the KCC bar number 3, and subsequently dried in a forced air oven at 150° F. for 20–30 seconds. Morton laminating adhesive 77T623 was applied to the dried ink surface using the K-Coater and the number 3 bar. The adhesive was dried using the same conditions as for the ink. A sheet of 92 LBT. 12 gage polyester (manufactured by DuPont, Inc.) was laid onto the printed sheet, and the rubber roll of a flexo hand proofer was rolled over the combined sheets to remove all air pockets. The resultant sandwich was placed in a Sentinel heat seal machine for 5 seconds at 250° F. and 60 psi to produce the final laminate. The laminates were cut into one-inch strips for peeling on a tensile tester.

Upon testing, the ink peel strength of the Control emulsion-based ink was measured at 132 grams per inch. The Latex #1-based ink had a peel strength of 156 grams per inch, a significant improvement.

EXAMPLE 2

To a solution of one part of META-TMI in 3.3 parts of butyl acrylate was added 0.3 part of 1-propanol and one drop of dibutyltin dilaurate catalyst. The mixture was stirred well and allowed to stand overnight at room temperature to effect reaction. Then 52.4 parts of styrene and 43 parts of butyl acrylate were added to produce 100 parts of monomer feed that was used in the procedure noted in Example 1 above. (The reaction of the propanol and TMI could have been completed in a couple of hours by heating it to 60° C.) The resulting emulsion polymer latex is hereafter referred to as Latex #2.

An ink was formulated and evaluated using the procedures noted in Example 1 above. Upon testing, the Latex #2-based ink had a peel strength of 157 grams per inch.

EXAMPLE 3

A series of emulsion polymer latices and inks were produced using the process noted in Examples 1 and 2 above, except that the urea and urethane-containing monomers were varied. The specific formulations and evaluation results are listed in Table I below.

TABLE I

Properties of Emulsion Polymer Latices and Inks

| Latex No. | Functional Monomer Components (ª) | pH | % Solids | Viscosity, cP | Particle Size, nm | Peel Strength, g/inch |
|---|---|---|---|---|---|---|
| Control (ᵇ) | | | | | | 132 |
| 1. | 1.0 TMI + 1.0 ARMEEN C | 8.5 | 47.5 | 117 | 65 | 156 |
| 2. | 1.0 TMI + 0.3 1-Propanol | 8.4 | 47.6 | 133 | 74 | 157 |
| 3. | 1.0 TMI + 0.6 2-BE | 8.6 | 46.8 | 123 | 63 | 174 |
| 4. | 1.0 TMI + 1.69 HEER | 8.5 | 46.5 | 108 | 67 | 157 |
| 5. | 1.0 TMI + 1.44 Amine D | 8.5 | 47.5 | 119 | 66 | 159 |
| 6. | 1.0 TMI + 0.58 DEAE | 8.5 | 47.3 | 108 | 70 | 173 |
| 7. | 1.0 TMI + 0.60 DAA (ᶜ) | 8.8 | 46.5 | 163 | 87 | 154 |
| 8. | 1.0 TMI + 0.54 BzOH | 8.7 | 47.7 | 190 | 84 | 155 |
| 9. | 1.0 ARMEEN C + 0.92 2-EHA + 1.0 TMI | 8.7 | 47.3 | 177 | 70 | 282 |
| 10. | 0.51 DMAPA + 0.92 2-EHA + 1.0 TMI | 8.4 | 46.7 | 160 | 73 | 190 |
| 11. | 0.65 AEP + 0.92 2-EHA + 1.0 TMI | 8.4 | 47.1 | 146 | 70 | 197 |
| 12. | 0.65 HEMA + 1.11 IPDI + 1.0 ARMEEN C | 8.4 | 46.7 | 119 | 65 | 191 |
| 13. | 0.65 HEMA + 1.11 IPDI + 0.30 1-Propanol | 8.4 | 47.4 | 143 | 69 | 198 |
| 14. | 0.65 HEMA + 0.87 TDI + 0.92 Dihexylamine | 8.5 | 47.0 | 125 | 63 | 190 |
| 15. | 0.65 HEMA + 1.11 IPDI + 0.60 DAA | 8.4 | 46.2 | 119 | 72 | 176 |
| 16. | 0.65 HEMA + 1.11 IPDI + 0.29 28% aq. ammonia (ᵈ) | 8.5 | 46.2 | 181 | 50 | 152 |
| 17. | 1.0 TMI + 1.98 CO-430 | 8.7 | 47.4 | 168 | 73 | 230 |
| 18. | 1.0 TMI + 1.43 CO-210 | 8.5 | 47.9 | 157 | 59 | 217 |
| 19. | 0.5 TMI + 0.85 HEER | 8.5 | 46.5 | 114 | 57 | 194 |
| 20. | 2.0 TMI + 3.4 HEER | 8.5 | 47.5 | 156 | 77 | 143 |

TABLE I-continued

Properties of Emulsion Polymer Latices and Inks

| Latex No. | Functional Monomer Components (ᵃ) | pH | % Solids | Viscosity, cP | Particle Size, nm | Peel Strength, g/inch |
|---|---|---|---|---|---|---|
| 21. | 1.0 TMI + 0.95 HEP(ᵉ) | 8.6 | 47.9 | 114 | 64 | 208 |
| 22. | 1.0 TMI + 0.44 HEAZ | 8.6 | 47.2 | 114 | 61 | 158 |

(ᵃ) Parts per 100 total monomer.
AEP = aminoethylpiperazine;
ARMEEN C = primary fatty amine from AKZO
2-BE = 2-butoxyethanol;
BzOH = benzyl alcohol;
DAA = diacetone alcohol;
DEAE = diethylaminoethanol;
DMAPA = dimethylaminopropylamine;
2-EHA = 2-ethylhexyl acrylate;
HEAz = hydroxyethylaziridine;
HEER = hydroxyethyl ester of rosin;
HEMA = hydroxyethyl methacrylate;
HEP = hydroxyethyl pthalimide;
IPDI = isophorone diisocyanate;
TDI = 2,4-tolylene diisocyanate;
TMI = META-TMI (an isocyanate-containing styrenic monomer manufactured by Cytek Industries).
(ᵇ) Control = styrene-butyl acrylate copolymer containing no urea or urethane functionality.
(ᶜ) Two parts 2-propanol added to solubilize monomer for co-feeding.
(ᵈ) One part 2-butoxyethanol added to solubilize monomer for co-feeding.
(ᵉ) Two parts N-methylpyrrolidinone added to solubilize monomer for co-feeding.

In the case of latices 7, 16, and 21, the urea or urethane monomer was insoluble in the styrene/butyl acrylate blend was simultaneously co-fed as a separate solution.

In the case of latices 9, 10, and 11, Michael addition was first carried out between the 2-ethylhexyl acrylate and the primary amine, followed by urea formation with the meta-TMI.

In the case of latices 12 through 16, the HEMA was first adducted with TDI or IPDI, followed by reaction with the amine or alcohol.

The emulsion polymer latices produced via the present method were suitable for use in formulating inks for laminating printing. Furthermore, all the inks produced exhibited good-to-excellent peel strengths in plastic film laminates.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved method for the production of polymer emulsion products having pH values in the range of 7.5 to 10.0, which comprises (A) reacting in an esterification reaction:

(1) 60.0 to 98.0% by weight of the total composition of the esterification reaction of a member selected from the group consisting of fumarated rosin, maleated rosin, and combinations thereof, and (2) 2.0 to 40.0% by weight of the total composition of the esterification reaction of a polyol selected from the group consisting of polyethylene glycols having a number average molecular weight in the range of 100–10,000, glycerol, sorbitol, pentaerythritol, neopentyl glycol, ethylene glycol, and combinations thereof, to produce a rosin-based support resin having an acid number in the range of 120 to 250; and (B) further reacting in a polymerization reaction:

(1) 5.0 to 40.0% by weight of the total composition of the polymerization reaction of said support resin;

(2) 0.2 to 2.0% by weight of the total composition of the polymerization reaction of an initiator;

(3) 1.0 to 12.0% by weight of the total composition of the polymerization reaction of a surfactant;

(4) 31.0 to 93.3% by weight of the total composition of the polymerization reaction of a member selected from the group consisting of acrylic monomers which do not contain either urea or urethane functionalities, (and) styrenic monomers which do not contain either urea or urethane functionalities, and combinations thereof; and wherein the improvement comprises also reacting in the polymerization reaction (5) 0.5 to 15.0% by weight of a urea or urethane-containing compound selected from the group consisting of monomers of the formula:

I.

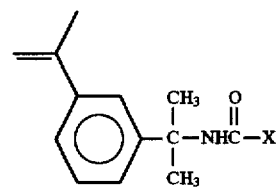

II.

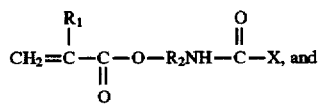

III.

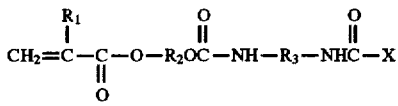

where:

R$_1$ is a member selected from the group consisting of —H and —CH$_3$,

R$_2$ is a member selected from the group consisting of C$_2$ to C$_4$ alkylenes, R$_3$ is a member selected from the group consisting of C$_4$ to C$_{16}$ hydrocarbyl groups, X is a member selected from the group consisting of —O—R$_4$ and —NR$_4$R$_4$, R$_4$ is a member selected from the group consisting of hydrogen, hydrocarbyl groups, keto-substituted hydrocarbyl groups, amino-substituted hydrocarbyl groups, amido-substituted hydrocarbyl groups, imido-substituted hydrocarbyl groups, ester-substituted hydrocarbyl groups, a carbocyclic or heterocyclic ring, polyether groups of the form

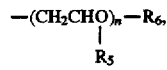

where

R$_5$ is a member selected from the group consisting of —H, —CH$_3$, and —CH$_2$CH$_3$, R$_6$ is a member selected from the group consisting of hydrocarbyl groups containing from 1 to 24 carbon atoms, and n is from 1 to 10, and combinations thereof, to produce the emulsion polymer composition.

2. The method of claim 1 which comprises (A) reacting in an esterification reaction:

(1) 75.0 to 98.0% by weight of the total composition of the esterification reaction of a member selected from the group consisting of fumarated rosin, maleated rosin, and combinations thereof, and (2) 2.0 to 25.0% by weight of the total composition of the esterification reaction of a polyol selected from the group consisting of polyethylene glycols having a number average molecular weight in the range of 100–10,000, glycerol, sorbitol, pentaerythritol, neopentyl glycol, ethylene glycol, and combinations thereof, to produce a rosin-based support resin having an acid number in the range of 120 to 250; and (B) further reacting in a polymerization reaction:

(1) 10.0 to 30.0% by weight of the total composition of the polymerization reaction of said support resin;

(2) 0.4 to 1.0% by weight of the total composition of the polymerization reaction of an initiator;

(3) 2.0 to 8.0% by weight of the total composition of the polymerization reaction of a surfactant;

(4) 55.0 to 86.6% by weight of the total composition of the polymerization reaction of a member selected from the group consisting of acrylic monomers which do not contain either urea or urethane functionalities, (and) styrenic monomers which do not contain either urea or urethane functionalities, and combinations thereof; and wherein the improvement comprises also reacting in the polymerization reaction (5) 1.0 to 6.0% by weight of a urea or urethane-containing compound selected from the group consisting of monomers of the formula:

I.

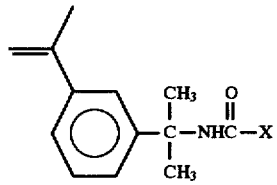

II.

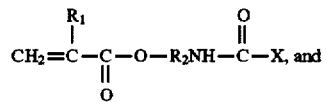

III.

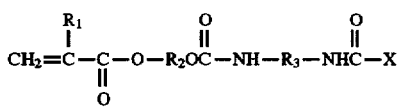

where:

R$_1$ is a member selected from the group consisting of —H and —CH$_3$,

R$_2$ is a member selected from the group consisting of C$_2$ to C$_4$ alkylenes, R$_3$ is a member selected from the group consisting of C$_4$ to C$_{16}$ hydrocarbyl groups, X is a member selected from the group consisting of —O—R$_4$ and —NR$_4$R$_4$, R$_4$ is a member selected from the group consisting of hydrogen, hydrocarbyl groups, keto-substituted hydrocarbyl groups, amino-substituted hydrocarbyl groups, amido-substituted hydrocarbyl groups, imido-substituted hydrocarbyl groups, ester-substituted hydrocarbyl groups, a carbocyclic or heterocyclic ring, polyether groups of the form

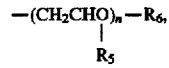

where

R$_5$ is a member selected from the group consisting of —H, —CH$_3$, and —CH$_2$CH$_3$, R$_6$ is a member selected from the group consisting of hydrocarbyl groups containing from 1 to 24 carbon atoms, and n is from 1 to 10, and combinations thereof, to produce the emulsion polymer composition.

3. The method of claim 1 wherein the acid number of the rosin-based support resin in the range of 150 to 200.

4. The method of claim 1 wherein the acrylic and styrenic monomers which do not contain either urea or urethane functionalities is selected from the group consisting of styrene, alpha-methyl-styrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, polyethylene glycol monomethacrylate, and combinations thereof.

5. The method of claim 1 wherein the initiator is selected from the group consisting of ammonium persulfate, potassium persulfate, sodium persulfate, and combinations thereof.

6. The method of claim 1 wherein the surfactant is selected from the group consisting of sulfated alkylphenoxypoly (ethyleneoxy) ethanol, octylphenoxypoly(ethyleneoxy) ethanol, and combinations thereof.

7. The method of claim 1 wherein the pH of the polymer emulsion product is in the range of 8.0 to 9.0.

8. The method of claim 2 wherein the pH of the polymer emulsion product is in the range of 8.0 to 9.0.

* * * * *